United States Patent
Ban

[11] 3,999,300
[45] Dec. 28, 1976

[54] GUIDE TOOL FOR MOLDING

[76] Inventor: Paul Ban, 5842 W. Florissant, St. Louis, Mo. 63120

[22] Filed: Oct. 3, 1975

[21] Appl. No.: 619,449

[52] U.S. Cl. .................... 33/174 G; 144/137; 144/144.5 R
[51] Int. Cl.² .................................. B27C 5/00
[58] Field of Search .......... 144/137, 134, 144 R, 144/216, 217, 321, 372, 373, 144.5; 33/174 G; 83/821

[56] References Cited
UNITED STATES PATENTS

| | | | |
|---|---|---|---|
| 3,217,393 | 11/1965 | Johnson | 33/174 G |
| 3,222,792 | 12/1965 | Eshom | 33/174 G |
| 3,386,177 | 6/1968 | Koscielski | 33/174 G |

Primary Examiner—Othell M. Simpson
Assistant Examiner—W. D. Bray
Attorney, Agent, or Firm—Cohn, Powell & Hind

[57] ABSTRACT

This guide tool is for use in providing contoured ends on wood molding to form corner joints. The tool provides profile margins adapted to guide a sawblade transversely of a length of molding to form an end which is contoured to overlie and mate with another length of molding of the same configuration, but having an end which is not contoured, to give a miter joint appearance.

4 Claims, 10 Drawing Figures

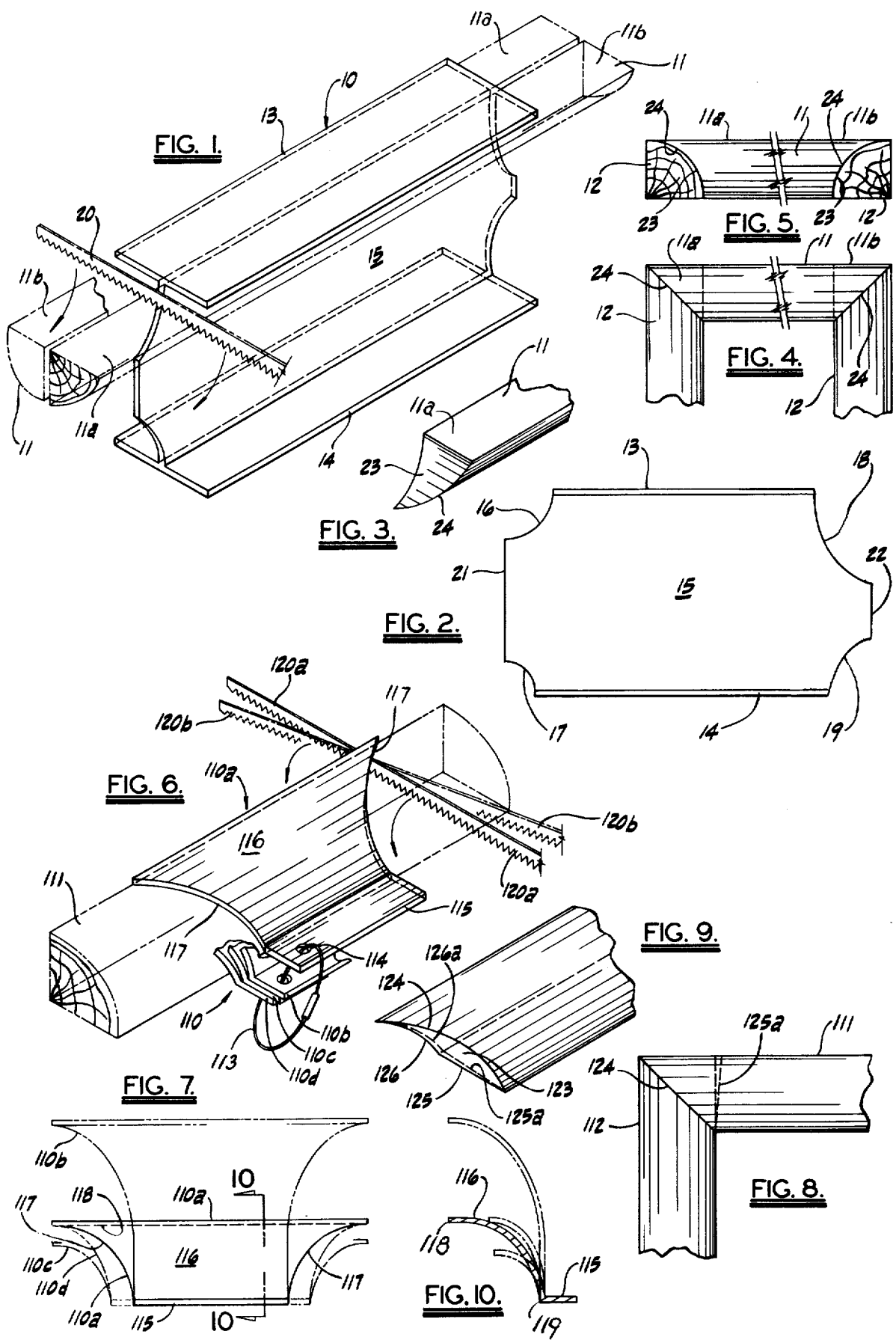

GUIDE TOOL FOR MOLDING

BACKGROUND OF THE INVENTION

This invention relates generally to the forming of corner joints in molding and particularly to a guide tool for contouring the ends of molding.

Quarter round, and similarly configurated molding, has been commonly used by builders and carpenters for many years to provide a suitable finished appearance at the juncture of walls and floors. In spite of this long use, corner joints are still formed either by providing 45° miter cuts in each of the two corner-forming portions, or by handforming the end of one portion to overfit the other portion. Considerable skill is required in forming accurately mitered ends, particularly in those instances in which the walls meet at a corner which is not exactly ninety degrees. On the other hand, the difficulty of hand-forming contoured ends is even more considerable and is compounded when the shape of the molding is other than a quarter round.

Hollow tubes have been devised for forming miter cuts on timber and, in addition, jigs are known which facilitate the cutting of 2 × 4 timber to a suitable shape for use as saw horse legs. However, neither of these means is adaptable to or suggests the formation of contoured ends on molding.

The present tool solves the above and other problems in a manner not disclosed in the known prior art.

SUMMARY OF THE INVENTION:

This guide tool provides a means of accurately contouring the ends of wood molding to form corner joints.

It is an important object of this invention to provide a tool which includes a plurality of profile margins and means for positioning the molding relative to a selected profile margin so that the margin provides a guide for a sawblade to produce a predetermined contour transversely of the molding which will mate with the contoured face of another identical molding.

An object of this invention is to provide a sheet metal section having a flange and a web cooperating to locate the molding, the web providing the profile margins.

Yet another object of this invention is to provide a guide tool having an I-shaped body providing a different profile margin at each corner of the web.

Still another object lies in the provision of a guide element having a curved face, defined by lower and upper margins, said face conforming substantially to the contoured face of the molding and said face including profile margins at each end, said margins diverging from each other in mirrorimage relation.

Yet another object is to provide a set of such guide elements, each corresponding to a different molding configuration.

It is an object of this invention to provide a guide tool which is simple and inexpensive to manufacture and is extremely efficient for its intended use.

BRIEF DESCRIPTION OF THE DRAWINGS:

FIG. 1 is a perspective view of the guide tool illustrating the manner of use;

FIG. 2 is an elevational view of the tool reduced in size;

FIG. 3 is a perspective view of a molding illustrating the contour of the cut end;

FIG. 4 is a plan view of a molding corner construction;

FIG. 5 is an elevational view of said corner construction taken on line 5—5 of FIG. 4;

FIG. 6 is a perspective view of a modified guide tool;

FIG. 7 is an elevational view of said modified tool;

FIG. 8 is a plan view of a molding corner construction formed with the modified tool and illustrating an overcut contoured end;

FIG. 9 is a perspective view of a molding illustrating said overcut contoured end; and FIG. 10 is a cross sectional view taken on line 10—10 of FIG. 7.

DESCRIPTION OF THE PREFERRED EMBODIMENT:

Referring now by characters of reference to the drawings and first to FIGS. 1–5 it will be understood that the tool, generally indicated by numeral 10, is intended for use as a guide for cutting the end of a wood molding, such as that indicated by numeral 11, so that the resulting contoured end will accurately fit the cross-sectional configuration of a piece of the identical molding, which has not been contoured. When fitted together in a corner construction as shown in FIGS. 4 and 5 the appearance presented is that of an accurately mitered joint.

In the preferred embodiment shown in FIGS. 1 and 2 the tool 11 is in the form of an I-beam constituting a body having upper and lower flanges 13 and 14 with a web 15 extending therebetween. Each of the four corners of the web 15 is shaped to provide a profile margin which corresponds to the exact cross section of the molding to be cut. For example, in the embodiment shown in FIG. 2, profile margins 16, 17, 18 and 19 are adapted to contour a three-fourths inch quarter round; a half-inch quarter round; a three-fourths inch by one half inch base molding and a one and three-fourths inch by three-fourths inch base molding respectively, all of which are conventional and commonly used molding sizes.

The end limits of the profile margins 17–19 are defined by the underside of the associated flanges 13 or 14 and the tool end margins 21 and 22. For example, profile margin 16 is defined by a three-fourths inch radius arcuate margin extending through ninety degrees from the underside of the upper flange 13 to the left-hand end margin 21.

The manner in which the tool 10 is used will be readily understood by reference to FIG. 1, which illustrates in phantom outline, two positions of the same piece of molding. End 11a is cut first and the molding 11 is held in place by one hand of the operator (not shown) with the perpendicularly related faces of said molding engaging the flange and web respectively, while saw blade 20 is drawn back and forth and at the same time moved downwardly along the arcuate profile margin 16. The result of this action is to form a contoured face at end 11a such as that indicated by numeral 23 in FIG. 3. The other end 11b of the molding 11 is similarly contoured, in mirror image of said end 11a, by endwise rotation of the molding 11 to a position in which end 11b is disposed on the other side of the guide tool 10 as illustrated by the partial showing of the molding 11 in FIG. 1.

The I-beam configuration of the tool 10 renders possible the formation of four different profile margins, one at each corner. As described above only one corner is used to cut oppositely contoured ends of the same piece of molding. The resultant piece of end contoured molding 11 shown in FIGS. 4 and 5 is used in conjunction with two square-ended pieces of molding, indicated by numeral 12, to form two corner constructions.

The modified tool shown in FIGS. 6, 7 and 10, and generally indicated by numeral 110, is used for the same purpose as that described above. In effect, tool 110 provides a tool set consisting of a plurality of components, such as 110a - 110d, which can be linked together as by loop 113, extending through apertures such as that indicated by numeral 114. Essentially, each of the component elements 110a - 110d is formed to suit a particular molding size which can correspond to those for which the tool 10 described above is configurated. For convenience the components will be described with reference to FIG. 6 which illustrates component 110a adapted to suit, for example, a three-fourths inch quarter round. The other components 110b - 110d are shown in phantom outline and need not be specifically described.

The component 110a, which constitutes a body, comprises a flange portion 115 and a curved web portion 116, said portion being defined by upper and lower margins 118 and 119. The curved portion 116 is configurated to suit the surface contour of the corresponding molding 111 and includes profile margins 117 at each end extending between said lower and upper margins in diverging, mirror-image relation, each margin corresponding to the cross section of an identical piece of molding as clearly shown in the elevational view, FIG. 7. The inside face of the curved portion 116 of the component 110a likewise corresponds to the cross section of the molding as clearly shown in the cross sectional view, FIG. 10.

The manner in which the modified tool is used is indicated in FIG. 6, which illustrates the curved portion 116 disposed in overlying relation to the contoured face of the molding 111, the outstanding flange 115 being set upon a wood block, or the like, and held by one hand of the operator (not shown). Importantly, FIG. 6 shows a jigsaw blade in two operating positions. In the first position of the blade, indicated by numeral 120a, said blade is disposed perpendicularly of the molding 111 and, in consequence, produces a perpendicular cut resulting in a contoured molding end 123 defined in FIG. 9 by margins 124, 125 and 126, which accurately fits the corresponding contoured surface of the molding 112.

In the second position of the blade, indicated by numeral 120b, said blade is disposed non-perpendicularly of the molding 111 so that the molding end is overcut. The result of this overcut is a contoured margin defined in FIG. 9 by margins 124, 125a and 126a. Thus, as shown in FIG. 8, even though margin 125a defines a contoured end of a molding 111 which does not exactly fit the surface contour of the mating piece 112, the margin 124 is accurately formed and the miter joint appearance is perfect.

I claim as my invention:

1. A guide tool for contouring the ends of molding of the type having two perpendicular faces and a contoured face extending between said perpendicular faces, said tool comprising:
   a. a substantially rigid body including one face engageable with one of said perpendicular molding faces and another face, perpendicularly related to said one face, engageable with the other of said perpendicular molding faces to position the molding for cutting, said one face having a profile margin configurated to guide a sawblade along a predetermined contour transversely of the molding to provide a contoured molding end adapted to substantially mate with the contoured face of a like molding.

2. A guide tool as defined in claim 1, in which:
   b. the body includes a flange means and a perpendicularly related interconnected web means said two means providing said perpendicularly related faces engageable by associated, perpendicularly related faces of said molding to position said molding, and
   c. said web means includes an end portion configurated to provide said saw blade guiding profile margin.

3. A guide tool as defined in claim 2, in which:
   d. said flange means extends perpendicularly outwardly on each side of said web means, and
   e. said web means includes opposed end portions each configurated to provide a saw blade guiding profile margin, said profile margins being different from each other.

4. A guide tool for contouring the ends of molding of the type having two perpendicular faces and a contoured face extending between said perpendicular faces, said tool comprising:
   a. a substantially I-shaped body defined by opposed substantially parallel elongate flange means and a web means extending therebetween,
   b. said web means including corner portions extending lengthwise beyond said flange means each configurated to provide a profile margin, said profile margins being different from each other, and
   c. said web means including at least one face engageable with one of said molding faces to position the molding for cutting, said profile margins being configurated to guide a sawblade along a predetermined contour transversely of the molding to provide a contoured molding end adapted to substantially mate with the contoured face of a like molding.

* * * * *